United States Patent [19]

Rohrer et al.

[11] 4,132,299

[45] Jan. 2, 1979

[54] FLUID COUPLING DEVICE WITH IMPROVED DISENGAGED OPERATING CHARACTERISTICS

[75] Inventors: Douglas D. Rohrer; Albert K. Blowers, both of Marshall, Mich.

[73] Assignee: Eaton Corporation, Cleveland, Ohio

[21] Appl. No.: 809,216

[22] Filed: Jun. 23, 1977

[51] Int. Cl.² .................. F16D 35/00; F16D 43/25
[52] U.S. Cl. ............................. 192/58 B; 192/82 T
[58] Field of Search ..................... 192/58 B, 82 T

[56] References Cited

U.S. PATENT DOCUMENTS

| 3,559,786 | 2/1971 | Long, Jr. | 192/58 B |
| 3,587,801 | 6/1971 | Riner | 192/58 B |

*Primary Examiner*—Allan D. Herrmann

*Attorney, Agent, or Firm*—Robert J. McCloskey; Leslie J. Kasper

[57] ABSTRACT

A fluid coupling device, especially a viscous fan drive, of the type including an output coupling member defining a fluid operating chamber. The device includes an input coupling member rotatably disposed in the operating chamber and cooperating with the output member to define a shear space. The output coupling member defines an annular inner surface, at least a major portion of the inner surface cooperating with the axis of rotation to define an included angle between about 20 degrees and about 70 degrees. The input coupling member defines an annular outer surface, a major portion of which conforms generally to the angled inner surface of the output coupling member and is closely spaced apart therefrom. The fluid coupling device of the invention has a substantially reduced idle speed, without a loss of peak speed, as well as a greatly reduced pump-out time.

13 Claims, 3 Drawing Figures

FLUID COUPLING DEVICE WITH IMPROVED DISENGAGED OPERATING CHARACTERISTICS

BACKGROUND OF THE DISCLOSURE

The present invention relates to torque transmitting fluid couplings, and more particularly, to such couplings which utilize internal valving, whereby the fluid coupling may be in either an engaged or disengaged condition, depending upon the position of the valving.

Fluid couplings of the type to which the present invention relates are well known in the art and may be better understood by reference to U.S. Pat. Nos. 3,055,473; 3,174,600; and 3,339,689, all of which are assigned to the assignee of the present invention. Briefly, such fluid couplings typically include an output coupling member and a cover which cooperate to define a fluid chamber, a valve plate dividing the fluid chamber into an operating chamber and a reservoir chamber, and an input coupling member disposed within the operating chamber and rotatable relative to the output coupling member. The input and output coupling members define a shear space such that rotation of the input member causes viscous fluid in the shear space to exert a viscous drag on the output member, causing it to rotate. The valve plate defines a fill orifice, and a valving arrangement controls the flow of fluid from the reservoir chamber, through the fill orifice, into the operating chamber. Typically, the valving is temperature-responsive, as is illustrated in the above-cited patents, such that below a certain ambient temperature, the valving is closed, most of the viscous fluid is discharged from the operating chamber to the reservoir chamber and the fluid coupling is considered to be "disengaged". Above the predetermined temperature, the valving gradually opens and viscous fluid is permitted to flow from the reservoir into the operating chamber, filling the shear space, such that the coupling is "engaged".

Conventional fluid couplings of the type to which the present invention relates have been provided with relatively small clearances between the outer periphery of the input member and the inner periphery of the output member, partly because the viscous fluid between these adjacent peripheries acts as a fluid bearing, and partly to maximize the available shear surface and the torque transmitting capacity. Therefore, although the present invention may be utilized in fluid coupling devices of many different embodiments, it is especially useful in those of the type in which the outer periphery of the input member and the inner periphery of the output member have been closely spaced apart. It is also especially useful in those in which some form of valving is provided to control the flow of fluid into the operating chamber, such that the coupling may be utilized in either an engaged or a disengaged condition.

Conventional fluid couplings have generally been of the type referred to as "full OD", i.e., the outer surface of the input member and the inner surface of the output member are cylindrical and have a maximum diameter over the entire axial extent of the respective surfaces. As noted previously, a full OD input member provides maximum torque transmission when the fluid coupling is engaged. With the coupling disengaged, however, several problems arise in connection wth the use of the full OD input member. One of these is the "cold-start" condition which arises after the coupling has been inoperative for a period of time and fluid has leaked from the reservoir into the operating chamber, causing the coupling to operate as though it were engaged when it is intended to be disengaged. Upon start-up of the coupling under this condition, it typically takes a full minute or more for enough of the fluid to be discharged from the operating chamber back into the reservoir chamber to reduce the speed of the output member to its normal, disengaged level. During this period of time, operation of the coupling is normally not desired, e.g., the coupling is driving the radiator cooling fan of a vehicle engine and no cooling is required upon initial start-up of the vehicle engine. Moreover, the continued, engaged operation of the coupling for a period of several minutes, typically at speeds well above 1,000 rpm, results in an objectionable noise level, especially when the engine is warming up at fast idle. A related problem is the output speed level of the coupling in the disengaged condition. A relatively higher disengaged output speed (referred to as "idle speed") results in a relatively higher horsepower consumption by the coupling and the associated cooling fan with no resultant benefit.

As the need for improved fuel efficiency in automobiles has developed, production of smaller cars has increased and it has become more common to equip such cars with viscous fan drives which, because of their ability to be disengaged when engine cooling is not needed, greatly reduce overall horsepower consumption. One result of this trend has been greater interest in improving the disengaged operating characteristics of viscous fan drives, especially the idle speed, which tends to be higher in the smaller cars because the proportionately smaller fans can be driven at a relatively high speed and consume a substantial amount of input horsepower by a small amount of viscous fluid in the shear space. The reduction of idle speed toward the ultimate (i.e., the output speed resulting from bearing drag alone, with no fluid in the shear space) requires more complete pump-out of viscous fluid from the shear space. One aspect of maximizing pump-out is the ability to maintain high efficiency of the wiper which causes a build-up of pressure within the operating chamber, adjacent the discharge orifice, resulting in flow through the discharge orifice into the reservoir.

Those skilled in the art of viscous fan drives who have attempted to reduce idle speed recently have been following one general approach, i.e., minimizing the occurrence of parallel, closely spaced surfaces on the input and output coupling members around their peripheries or, where such parallel surfaces do exist, increasing the clearance between them. For example, in U.S. Pat. No. 3,990,556, the outer periphery of the input coupling member is provided with a series of notches such that adjacent notches join to form a line, rather than a surface and the specification of the cited patent states that "If there were provided any faces instead of a line of notch means ... the residual fluid in the working chamber would transmit the torque from the input member to the output member."

Similarly, in U.S. patent application Ser. No. 764,772, filed Feb. 2, 1977 in the name of K. R. Streeter, for a "FLUID COUPLING DEVICE WITH IMPROVED DISENGAGED OPERATING CHARACTERISTICS", assigned to the assignee of the present invention, the inner surface of the output member is cylindrical, while the outer surface of the input coupling member is frusto-conical, primarily to reduce the peripheral face-to-face engagement and reduce the idle speed.

As a further example, a commercially available viscous fan drive, produced by someone other than the assignee of the present invention, is basically of the full OD type discussed previously, but with the OD clearance (i.e., the radial dimension between the outer surface of the input member and the inner surface of the output member) increased to such an extent that, even though idle speed is reduced, the pump-out time is increased because of reduced wiper efficiency, as will be described in greater detail subsequently.

SUMMARY OF THE INVENTION

Accordingly, it is an object of the present invention to provide a fluid coupling device in which the input and output coupling members are configured to improve the disengaged operating characteristics, especially idle speed, without adversely affecting the engaged operating characteristics, especially peak speed.

The above and other objects of the invention are accomplished by the provision of an improved fluid coupling device including a first rotatable member, cover means associated with the first member to define a fluid chamber, a valve plate disposed to separate the fluid chamber into an operating chamber and a reservoir chamber, and a second rotatable member disposed in the operating chamber. The second member has first and second wall surfaces oriented generally perpendicular to the axis of rotation, defining an axial separation T therebetween, and an annular outer surface extending between the first and second wall surfaces. Valve means is associated with the valve plate to control the flow of fluid from the reservoir chamber into the operating chamber and temperature responsive means is associated with the valve means to effect the operation of the valve means in response to variations in a predetermined temperature condition. The first member defines a generally annular inner surface having an axial extent greater than T, at least a major portion of said inner surface cooperating with the axis of rotation to define a first included angle. At least a major portion of the outer surface of the second member cooperates with the axis of rotation to define a second included angle, and is closely spaced apart from the major portion of the inner surface over at least part of the axial extent thereof. The second included angle is approximately equal to, or greater than the first included angle.

BRIEF DESCRIPTIONS OF THE DRAWINGS

BRIEF DESCRIPTION OF THE PREFERRED EMBODIMENT

Figure 1:
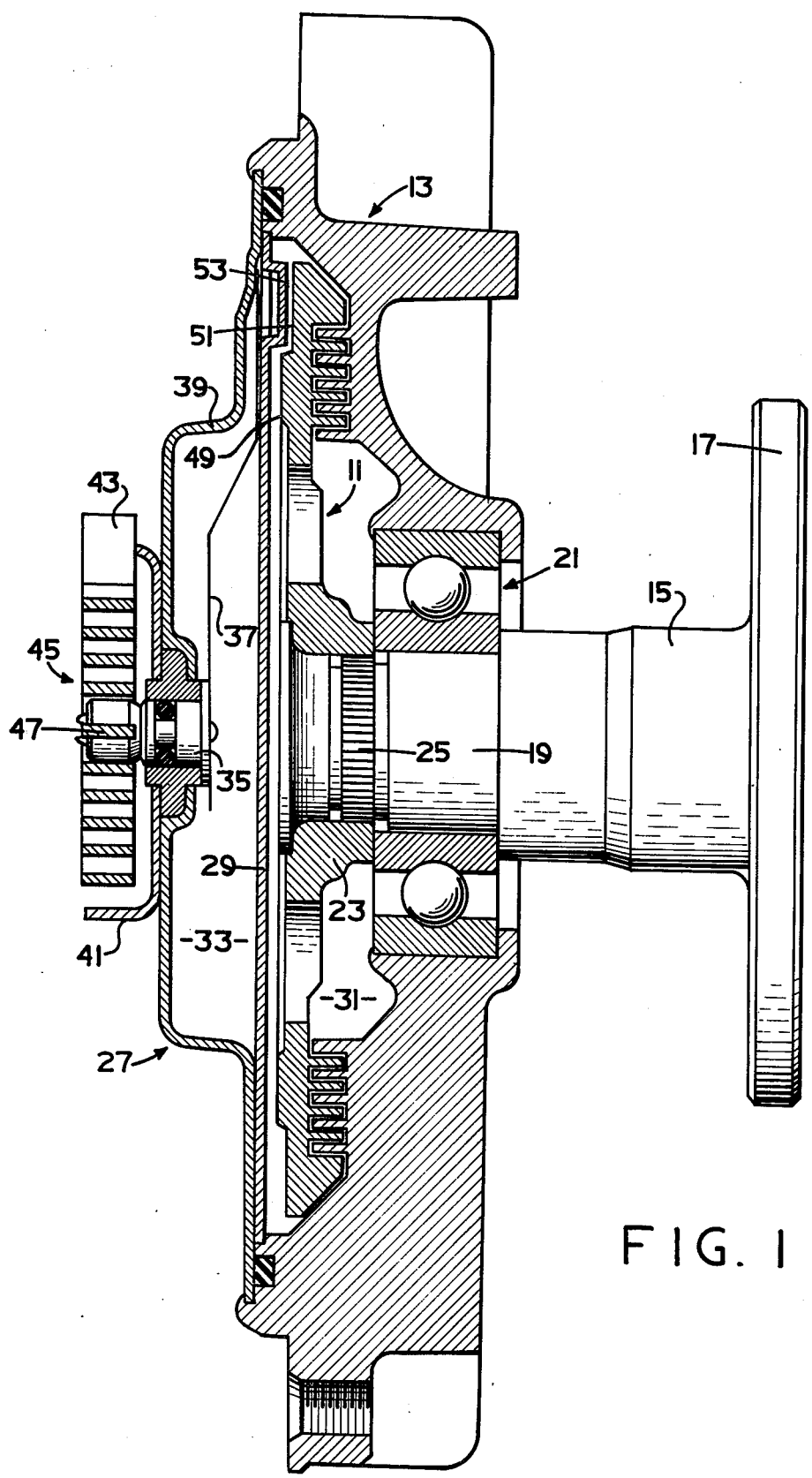
FIG. 1 is an axial cross section of a typical fluid coupling device of the type with which the present invention may be utilized.

Referring now to the drawings, which are not intended to limit the present invention, FIG. 1 illustrates the preferred form of a fluid coupling device with which the present invention may be utilized. The fluid coupling device includes an input coupling member 11 and an output coupling member 13. The fluid coupling device is shown herein as a drive for an automotive engine accessory, and specifically, as a drive for a radiator cooling fan. It will be understood, however, that the use of the present invention is not limited to any particular fluid coupling configuration or application.

The fluid coupling includes an input shaft 15 on which input member 11 is mounted and which is rotatably driven, such as by means of a flange 17 which, in the subject embodiment, may be bolted to the water pump flange (not shown). The input shaft 15 has a reduced shaft portion 19 intermediate its ends which functions as a support for the inner race of a bearing set 21, seated on the inside diameter of the output coupling member 13.

The input coupling member 11 is in the form of a disc having a hub portion 23 supported by the forward end of the shaft 15. The hub portion 23 has an opening therethrough which has an interference fit with a serrated portion 25 of the shaft 15. The hub portion 23 is pressed onto the shaft 15 until it abuts the side of the inner race of the bearing set 21, and the output end (left end in FIG. 1) of the shaft 15 is balled over to positively retain the input coupling member 11 on the shaft, such that rotation of the shaft 15 causes rotation of the input coupling member 11.

The output coupling member 13 cooperates with a cover assembly, generally designated 27, to define a fluid chamber therebetween, the fluid chamber being separated by a valve plate 29 into a fluid operating chamber 31 and a fluid reservoir chamber 33. Rotatably supported by the cover assembly 27 is a valve shaft 35 having attached to its inner end (right end in FIG. 1), a valve arm 37, the general construction and operation of which may be better understood by reference to the above-mentioned U.S. Pat. No. 3,055,473. The cover assembly 27 includes a cover member 39 which, in the subject embodiment, is a single-piece metal stamping. Attached, as by welding, to the outer surface of the cover member 39 is a bracket member 41 which supports an outer end 43 of a bimetal coil, generally designated 45, with an inner end 47 thereof which is positioned in a slot formed in the outer end of the valve shaft 35.

It should be understood that the scope of the present invention is not limited to any particular configuration of valving to control the flow of fluid from the fluid reservoir chamber 33 into the fluid operating chamber 31. Nor is the invention limited to any particular type of temperature-responsive means to control the valving, it being necessary only that the valving be controlled in response to a predetermined condition to cause the coupling to be either engaged or disengaged.

Figure 3:
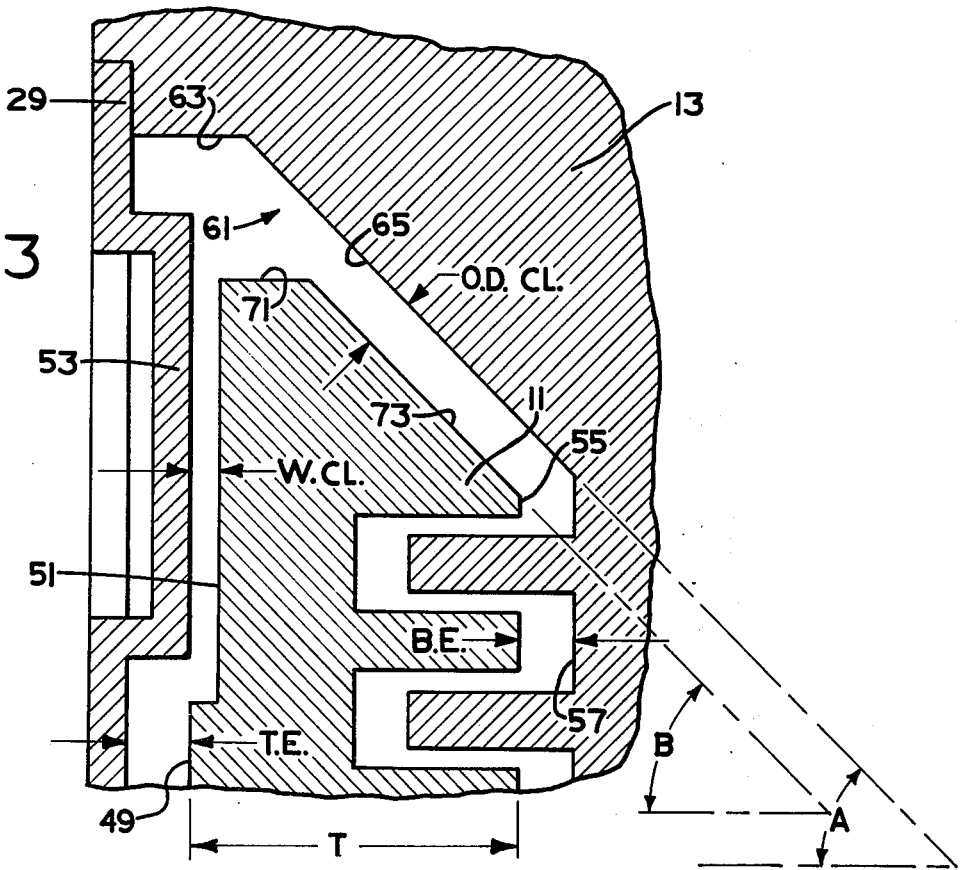
FIG. 3 is an enlarged, fragmentary view, similar to FIG. 1 but on a different plane, illustrating the present invention.

Referring now to FIG. 3, in conjunction with FIG. 1, the input coupling member 11 defines a forward surface 49 and a recessed forward surface 51 adjacent the outer periphery of the coupling member 11. The recessed forward surface 51 provides clearance for a wiper portion 53 which may be formed integrally during the stamping of the valve plate 29, or may comprise a member welded to the valve plate subsequent to stamping. The wiper portion 53 operates in a manner well known in the art to generate a region of increased fluid pressure adjacent the trailing edge of the wiper portion 53, because the input member 11 and the fluid contained in the operating chamber 31 are rotating at a faster speed than is the output member 13. Adjacent the trailing edge of the wiper portion 53, the valve plate 29 defines a discharge orifice (not seen in FIG. 1 or 3), whereby the increased fluid pressure within the operating chamber 31 causes a flow of fluid through the discharge orifice into the reservoir chamber 33.

Referring now primarily to FIG. 3, the input coupling member 11 defines a rearward wall surface 55, and the output member 13 defines a wall surface 57, closely spaced apart from the rearward wall surface 55. The wall surfaces 55 and 57 cooperate to define a plurality of concentric, interdigitated, annular lands and grooves as is well known in the art which, in turn, cooperate to define a shear space. It should be appreciated that the use of the interdigitated lands and grooves is primarily to maximize the available shear area and the torque transmitting capability of the coupling, but the scope of the present invention is not limited to any particular configuration of shear space.

The output coupling member 13 defines an annular inner surface, generally designated 61, including a cylindrical portion 63 and a frusto-conical portion 65. The input coupling member 11 also defines an annular outer surface including a cylindrical surface portion 71 and a frusto-conical surface portion 73. The forward surface 49 and rearward surface 55 of input coupling member 11 define an axial separation T, such that the axial extent of the annular inner surface 61 is somewhat greater than T. The frusto-conical surface portion 65 should comprise at least a major portion of the total inner surface 61 and should have an axial extent equal to at least about 0.7T, for reasons which will be described subsequently. Similarly, the frusto-conical surface portion 73 should comprise at least a major portion of the total annular outer surface of the input member 11 and should have an axial extent equal to at least about 0.5T, for reasons which also will be described subsequently.

In theory, it may be advantageous for the frusto-conical surface portion 73 to extend further upward and to the right in FIG. 3 until it meets the recessed forward surface 51, eliminating the cylindrical surface 71. However, the surface 71 is preferably provided to permit holding of the input coupling member 11 during machining thereof. Also, having a sharper corner on the outer periphery of the member 11 would probably result in damage to the corner during the normal handling incident to the manufacturing process. In the subject embodiment, the axial extent of the cylindrical surface 71 is approximately 0.050 inches (1.27 mm).

An essential feature of the present invention is the provision of an angled or frusto-conical surface portion on both the input member 11 and the output member 13. The frusto-conical surface portion 65 cooperates with the axis of rotation of the device to define an included angle A, while the frusto-conical surface portion 73 cooperates with the axis of rotation to define an included angle B. As used herein the term "included angle" will be understood to mean an angle greater than zero degrees, but less than ninety degrees.

During the development of the present invention, it has been found that both of the included angles A and B could vary over a substantial range without a serious reduction in the performance of the fluid coupling. Although the included angle A defined by the inner frusto-conical surface portion 65 could be as small as five degrees to ten degrees, it is preferably in the range of about twenty degrees to about sixty degrees, and in the subject embodiment, the included angle A is illustrated as forty-five degrees. The included angle B defined by the outer frusto-conical surface portion 73 may, similarly, be as little as five degrees to ten degrees, and still result in a fluid coupling having improved disengaged operation characteristics. Preferably, however, the included angle B is also in the range of about twenty degrees to about sixty degrees and in the subject embodiment, is illustrated as forty-five degrees.

From the foregoing description, it will be understood that within the scope of the invention, the included angles A and B may vary within the specified ranges independently of each other. However, from an operating viewpoint, there does not appear to be any advantage in making included angle B either larger or smaller than included angle A, and in the embodiment of FIG. 3, the frusto-conical surfaces 65 and 73 are substantially parallel. Furthermore, contrary to the trend in the recent development of the prior art, the surfaces 65 and 73 are closely spaced apart to provide a maximum shear area and torque transmitting capability during engaged operation. As used herein, the term "closely spaced apart" in reference to surfaces 65 and 73 will be understood to mean that the surfaces 65 and 73 are sufficiently close together such that viscous fluid contained therebetween is able to transmit at least a certain minimum amount of torque from the input member 11 to the output member 13. It has been found that the present invention operates advantageously with the clearance between the surfaces 65 and 73 (outside diameter clearance, O.D.CL.) in the range of about 0.020 inches (0.50 mm).

It will be appreciated that when the included angles A and B are somewhat different, the surfaces 65 and 73 are not parallel, the use of the term "closely spaced apart" in reference to surfaces 65 and 73 will indicate only that the surfaces are close together over a part of the axial extent thereof.

When the fluid coupling of the present invention is operating in the disengaged condition, i.e., when the valve arm 37 covers the fill orifice and uncovers the discharge orifice, it is desirable, as described previously, to pump as much of the viscous fluid as possible out of the operating chamber 31. The fluid being pumped from the operating chamber 31 is primarily that which is being forced radially outward by centrifugal force through the shear space defined by rearward wall surface 55 and wall surface 57. Referring now to the prior art device illustrated in FIG. 2, having a greatly enlarged OD clearance, it may be appreciated that there is a tendency for the fluid leaving the shear space and entering the OD clearance to form a fluid layer, held by centrifugal force against the inner surface of the output member. In an attempt to reduce idle speed, the OD clearance was increased until it was greater than the thickness of the fluid layer, thus substantially eliminating contact between the fluid layer and the outer surface of the input member. However, this greater OD clearance (smaller input member diameter) has resulted in a portion of the wiper being disposed radially outward from the outer surface of the input member, thus reducing wiper efficiency and increasing pump-out time.

Figure 2:
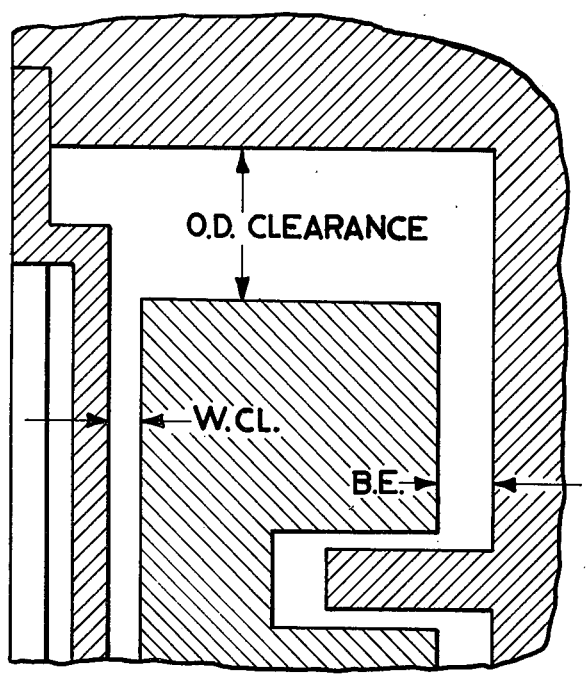
FIG. 2 is an enlarged, fragmentary view, illustrating a prior art fluid coupling device such as was used to generate the comparative test data presented hereinafter.

Referring again to FIG. 3, it may be seen that because of the angled surfaces 65 and 73, it is impossible to have a layer of viscous fluid of the same volume as in FIG. 2 held by centrifugal force against the cylindrical surface 63.

It should be appreciated that although the frusto-conical surfaces 65 and 73 are shown in FIGS. 1 and 3 as being straight lines (in cross-section), it is within the scope of the invention for the surfaces 65 and 73 to vary somewhat from the straight configuration shown. For example, the surfaces 65 and 73 could define a compound angle, i.e., each could comprise two surface portions, with each surface portion defining a different included angle relative to the axis of rotation. Also, either or both of the surfaces 65 and 73 could appear in cross section as slightly curvilinear. The essential feature in regard to the surfaces 65 and 73 is the overall frusto-conical configuration.

To illustrate further the improvement is disengaged operating characteristics which may be achieved utilizing the present invention, test data will be presented hereinafter comparing the invention (as shown in FIG. 3) with the prior art device of FIG. 2. At the time of the present invention, the prior art device of FIG. 2 was considered by applicant to be about the most satisfactory device as far as disengaged operating characteristics, especially idle speed.

For purposes of the test data presented, eleven sample units were prepared, Sample Nos. 1-6 being the prior art device of FIG. 2 and Sample Nos. 7-11 being the invention as in FIG. 3. At the time of assembly of the units, measurements were taken of various clearances, which are shown in the first portion of the data table and labelled in FIGS. 2 and 3. Wiper clearance (W.CL.) is the distance between the wiper portion 53 and recessed forward surface 51. Generally, wiper efficiency has been found to increase as wiper clearance decreases. Outside diameter clearance (O.D.CL.) is measured radially in the prior art device, but in the invention, is measured perpencidular to the surfaces 65 and 73. In either case, it is the width of the gap between the input and output coupling members. Bottom end clearance (B.E.) is the distance between rearward wall surface 55 and the wall surface 57. Top end clearance (T.E.) is the distance between the valve plate 29 and the forward surface 49. Each of these clearances is generally considered relevant to idle speed (i.e., the speed of the output coupling member 13 with the unit disengaged). For each sample unit, two tests were run; one at 3500 rpm input speed, and the other at 4500 rpm input speed. At each input speed, an output speed reading was taken for IDLE (disengaged) and PEAK (engaged) and a calculation was made of P/I, the ratio of peak speed to idle speed. As is well known to those skilled in the art, the P/I ratio is important as an indication of the ability of a unit to have reduced idle speed without a loss of peak speed. Finally, the last column of data is the time (in seconds) required for the unit to pump-out, i.e., go from engaged to disengaged, at an input speed of 2000 rpm. It is, of course, desirable for pump-out time to be a minimum. Each of the sample units was an Eaton Series 140 fan drive, the type used commerically on the Chevrolet Chevette, but with OD clearances as shown in the data, for Sample Nos. 1-6, which are larger than those on the units sold commerically. Each unit was equipped with the same 12.6 inch fan and contained the same volume of 2000 cs. fluid. The bottom line indicates the % of improvement, using the invention, for IDLE, P/I ratio and PUMP-OUT time.

| Sample No. | Clearances | | | | 3500 rpm Input | | | 4500 rpm Input | | | PUMP-OUT |
|---|---|---|---|---|---|---|---|---|---|---|---|
| | Wiper | O.D. | B.E. | T.E. | IDLE | PEAK | P/I | IDLE | PEAK | P/I | |
| 1 | .019 | .046 | .023 | .041 | 1650 | 2700 | 1.64 | 1650 | 3050 | 1.85 | 27 |
| 2 | .014 | .047 | .024 | .036 | 1650 | 2820 | 1.71 | 1550 | 3250 | 2.10 | 36 |
| 3 | .012 | .047 | .023 | .036 | 1400 | 2800 | 2.00 | 1500 | 3050 | 2.03 | 27 |
| 4 | .014 | .045 | .019 | .039 | 1550 | 2850 | 1.84 | 1650 | 3150 | 1.91 | 33 |
| 5 | .014 | .050 | .022 | .038 | 1350 | 2850 | 2.11 | 1450 | 3300 | 2.28 | 23 |
| 6 | .015 | .048 | .020 | .038 | 1350 | 2730 | 2.02 | 1530 | 3060 | 2.00 | 30 |
| AVG. | .0147 | .0472 | .0218 | .0380 | 1492 | 2792 | 1.87 | 1550 | 3143 | 2.02 | 29.3 |
| 7 | .014 | .044 | .029 | .034 | 1100 | 2700 | 2.45 | 1300 | 3000 | 2.31 | 22 |
| 8 | .016 | .040 | .029 | .034 | 1150 | 2700 | 2.35 | 1350 | 2900 | 2.44 | 19 |
| 9 | .016 | .039 | .029 | .035 | 1300 | 2750 | 2.12 | 1350 | 3000 | 2.22 | 24 |
| 10 | .016 | .045 | .023 | .038 | 1250 | 2750 | 2.20 | 1350 | 3100 | 2.30 | 24 |
| 11 | .014 | .040 | .029 | .035 | 1200 | 2750 | 2.29 | 1250 | 3050 | 2.44 | 18 |
| AVG. | .0152 | .0146 | .0278 | .0352 | 1200 | 2730 | 2.28 | 1320 | 3010 | 2.28 | 21.4 |
| % Improvement With Invention | | | | | | 19.6% | 21.9% | 15.1% | | 12.9% | 27.0% |

In reviewing the above data, and the % improvements for IDLE, it should be noted that the effect of bearing drag was not taken into effect. For example in the units tested it was found that with absolutely no fluid in the unit, the unit would still have an "IDLE" speed of at least about 800 rpm due to bearing drag (the drag of the bearing set 21 of FIG. 1). Therefore, recalculating the % improvement taking bearing drag into account, 800 rpm could be used as the "zero" point, or the indication of absolute minimum possible idle speed. For example, at 3500 rpm input, the prior art devices averaged 692 rpm (1492-800) above "zero" while the invention averaged 400 rpm (1200-800) above "zero", an actual improvement (decrease) of 292 rpm. This decrease in idle speed toward the minimum possible represents an improvement of 42%. A similar recalculation can be made for the other percentage figures to yield more meaningful results.

We claim:

1. A fluid coupling device comprising:
   (a) a first rotatable member;
   (b) cover means associated with said first member to define a fluid chamber therebetween;
   (c) a valve plate disposed to separate said fluid chamber into a fluid operating chamber and a fluid reservoir chamber;
   (d) a second rotatable member disposed in said fluid operating chamber and being rotatable relative to said first member, said second member having first and second wall surfaces oriented generally perpendicular to the axis of rotation of said members, and a generally annular outer surface extending between said first and second wall surfaces;
   (e) valve means associated with said valve plate to control the flow of fluid between said reservoir chamber and said operating chamber and means associated with said valve means to effect the operation of said valve means in response to variations in a pre-determined condition;
   (f) said first member defining a generally annular inner surface, at least a major portion of said inner surface cooperating with said axis of rotation to define a first included angle; and
   (g) at least a major portion of the outer surface of said second member cooperating with said axis of rotation to define a second included angle, said major portion of said outer surface and said major portion of said inner surface being closely spaced apart over at least a portion thereof, said second included angle being approximately equal to or greater than, said first included angle.

2. A fluid coupling device as claimed in claim 1 wherein said major portion of said inner surface comprises a first generally frusto-conical surface.

3. A fluid coupling device as claimed in claim 2 wherein said first member defines a wall surface adjacent said second wall surface of said second member and cooperating therewith to define a shear space therebetween, said first and second wall surfaces of said second member having an axial separation T.

4. A fluid coupling device as claimed in claim 3 wherein said first generally frusto-conical surface extends axially a distance equal to at least about 0.75T and said first included angle is between about twenty degrees and about sixty degrees.

5. A fluid coupling device as claimed in claim 4 wherein said major portion of said outer surface comprises a second generally frusto-conical surface.

6. A fluid coupling device as claimed in claim 5 wherein said second generally frusto-conical surface extends axially a distance equal to at least about 0.5T and said second included angle is between about twenty degrees and about sixty degrees.

7. A fluid coupling device as claimed in claim 1 wherein at least one of said first and second included angles is approximately forty-five degrees.

8. A fluid coupling device as claimed in claim 1 wherein said valve plate is closely spaced apart from said first wall surface of said second member, and said valve plate defines a discharge orifice disposed adjacent said inner surface for communicating fluid from said operating chamber to said reservoir chamber.

9. A fluid coupling device as claimed in claim 8 including wiper means operatively disposed relative to said discharge orifice to generate a region of increased fluid pressure within said operating chamber adjacent said discharge orifice.

10. A fluid coupling device as claimed in claim 1 wherein said major portion of said outer surface and said major portion of said inner surface cooperate to define a shear space therebetween having a thickness, over a major portion of its extent, in the range of about 0.020 inches (0.508 mm) to about 0.080 inches (2.03 mm).

11. A fluid coupling device comprising:
(a) a first rotatable member;
(b) cover means associated with said first member to define a fluid chamber therebetween;
(c) a valve plate disposed to separate said fluid chamber into a fluid operating chamber and a fluid reservoir chamber;
(d) a second rotatable member disposed in said fluid operating chamber and being rotatable relative to said first member, said second member having first and second wall surfaces oriented generally perpendicular to the axis of rotation of said members, and a generally annular outer surface extending between said first and second wall surfaces;
(e) valve means associated with said valve plate to control the flow of fluid between said reservoir chamber and said operating chamber and means associated with said valve means to effect the operation of said valve means in response to variations in a pre-determined condition;
(f) said first member defining a generally annular inner surface, at least a major portion of said inner surface comprising a first generally frusto-conical surface;
(g) at least a major portion of the outer surface of said second member comprising a second generally frusto-conical surface;
(h) said first and second frusto-conical surfaces being closely spaced apart, being oriented generally parallel to each other and cooperating with said axis of rotation to define an included angle between about twenty degrees and about sixty degrees.

12. A fluid coupling device as claimed in claim 11 wherein said first and second frusto-conical surfaces cooperate to define a shear space therebetween having a thickness in the range of about 0.020 inches (0.508 mm) to about 0.080 inches (2.03 mm).

13. A fluid coupling device as claimed in claim 11 wherein said valve plate is closely spaced apart from said first wall surface of said second member, said valve plate defines a discharge orifice disposed adjacent said inner surface for communicating fluid from said operating chamber to said reservoir chamber, and including wiper means operatively disposed relative to said discharge orifice.

* * * * *